(12) United States Patent
Johnson et al.

(10) Patent No.: US 7,356,407 B2
(45) Date of Patent: Apr. 8, 2008

(54) OPTIMAL ROUTE CALCULATION BASED UPON COHORT ANALYSIS

(75) Inventors: Richard A. Johnson, Rochester Hills, MI (US); Xiaowen Dai, Shelby Township, MI (US); Robert P. Roesser, Southfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 201 days.

(21) Appl. No.: 11/244,788

(22) Filed: Oct. 6, 2005

(65) Prior Publication Data

US 2007/0083326 A1    Apr. 12, 2007

(51) Int. Cl.
    G01C 21/30    (2006.01)
(52) U.S. Cl. ............... 701/209; 701/210; 340/995.19; 340/995.22
(58) Field of Classification Search ............... 701/208, 701/210; 340/995.19, 995.22
    See application file for complete search history.

(56) References Cited

U.S. PATENT DOCUMENTS

| | | | |
|---|---|---|---|
| 6,081,660 A | | 6/2000 | Macleod et al. |
| 6,216,086 B1* | | 4/2001 | Seymour et al. ............. 701/202 |
| 6,393,397 B1 | | 5/2002 | Choi et al. |
| 6,622,087 B2* | | 9/2003 | Anderson ................... 701/209 |
| 2002/0152024 A1 | | 10/2002 | Stefan |
| 2003/0083808 A1 | | 5/2003 | Stefan et al. |
| 2003/0126100 A1* | | 7/2003 | Chithambaram ............... 706/8 |
| 2004/0015291 A1* | | 1/2004 | Petzold et al. .............. 701/202 |
| 2005/0159889 A1* | | 7/2005 | Isaac .......................... 701/210 |
| 2005/0234637 A1* | | 10/2005 | Obradovich et al. ........ 701/200 |
| 2006/0116815 A1* | | 6/2006 | Nomura ...................... 701/210 |
| 2006/0149461 A1* | | 7/2006 | Rowley et al. ............. 701/202 |
| 2007/0073480 A1* | | 3/2007 | Singh ......................... 701/211 |

* cited by examiner

*Primary Examiner*—Brian J. Broadhead

(57) ABSTRACT

The invention includes cohort analysis as an element of an in-vehicle navigation system. As an operator makes trips from an origin to a destination, the navigation system records various route segments chosen. These choices are compared to route segments comprising a minimal time route calculated for the trip. Segments not part of the prescribed route are collected and periodically sent along with the origin and destination to a centralized server, wherein they are stored in a database. The central server also has an extensive map database that lists many attributes for each segment not generally included in an in-vehicle database. The attributes include variables pertaining to traffic flow, e.g. speed, number of lanes, lane width; topology, e.g. possible turns at endpoints; geometry, e.g. horizontal shape, vertical curvature, and super-elevation; usage, e.g. freeway, arterial, local, residential, business; and topography, e.g. buildings, trees, open-space, facilities, and stores.

9 Claims, 2 Drawing Sheets

OPTIMAL ROUTE CALCULATION BASED UPON COHORT ANALYSIS

TECHNICAL FIELD

This invention pertains generally to motor vehicles, and more specifically to motor vehicles having on-board navigation systems.

BACKGROUND OF THE INVENTION

In-vehicle navigation systems are generally known. Current navigation systems typically require the operator to input a starting point and a destination. Based on these two points, navigation software accesses an existing map database, calculates an optimal route, and provides detailed maneuvering instructions to arrive at the destination from the starting point.

Calculating an optimized route between an origin and destination generally involves the definition of an objective function that is to be either maximized or minimized. Travel time and distance comprise common and obvious examples of objective functions. It is likely that at times many vehicle operators prefer other criteria for route selection that are more abstract and difficult to define. For example, one type of operator may prefer a route consisting of tree-lined streets and another prefers a route with many shopping opportunities, or both. It may be useful to discover and categorize route preferences of operators from observing their choices during real-world trips. A useful method for accomplishing this is detailed hereinafter, and referred to as cohort analysis.

SUMMARY OF THE INVENTION

Cohort analysis comprises an element of an in-vehicle navigation system. As an operator makes trips from an origin to a destination, the navigation system records various route segments chosen. These choices are compared to route segments comprising a minimal time route calculated for the trip. Segments not part of the prescribed route are collected and periodically sent along with the origin and destination to a centralized server, wherein they are stored in a database. The central server also has an extensive map database that lists many attributes for each segment not generally included in an in-vehicle database. The attributes include variables pertaining to traffic flow, e.g. speed, number of lanes, lane width; topology, e.g. possible turns at endpoints; geometry, e.g. horizontal shape, vertical curvature, and super-elevation; usage, e.g. freeway, arterial, local, residential, business; and topography, e.g. buildings, trees, open-space, facilities, and stores.

For each operator, the cohort analyzer collects attribute values and combinations of attribute values that occur frequently to form a profile. Identifications of frequently traveled segments are also included in the operator's profile. The operator profile is compared to that of other operators to discover similarities and differences. Clusters of operators sharing similar profiles are formed and adjusted to separate them from other clusters. Clusters are combined into a manageable number of categories. Each operator is assigned to a category based upon similarity of attributes and route segments in the operator's profile and those in the category. Each category and associated attribute value information is sent to each operator's in-vehicle navigation system wherein it is stored for future reference. When calculation of subsequent routes is requested by the operator, the in-vehicle navigation system uses the cohort-determined data along with travel time and distance to form an objective function. The operator selects weights assigned to each criteria, including cohort data, travel time, and travel distance.

Therefore, the present invention provides an improvement over conventional navigation systems by providing a method and articles of manufacture for identifying a preferred travel route for an operator of a vehicle. This includes establishing a navigation system having a route optimization function incorporating a cohort attribute model, selecting an origin point and a destination point; and, determining a travel route, based upon estimated travel time, travel distance, and cohort attribute information.

Another aspect of the invention comprises generating navigation instructions based upon the navigation system.

Another aspect of the invention comprises determining a travel route based upon operator-selectable weightings of the estimated travel time, travel distance, and cohort attribute information.

A further aspect of the invention comprises establishing a navigation system having a route optimization function incorporating a cohort attribute model by determining information for a plurality of vehicle operators, including creating an operator profile for each operator. An operator profile is preferably created by comparing operator-selected route segments to optimal route segments for each trip, capturing operator-selected route segments divergent from the optimal route segments, and, evaluating the divergent operator-selected route segments based upon attributes. A plurality of clusters of operator profiles, each cluster based upon similarity of the attributes of divergent operator-selected route segments is created. A plurality of categories of operators, each category defined by the attributes of divergent operator-selected route segments is determined. Each operator is assigned to one of the plurality of categories, based upon the operator profile.

Another aspect of the invention includes comparing operator-selected route segments to optimal route segments for each trip, which comprises comparing operator-selected route segments to a corresponding minimal-time route segment.

Another aspect of the invention includes comparing operator-selected route segments to optimal route segments for each trip by comparing operator-selected route segments to a corresponding minimal-distance route segment.

Another aspect of the invention includes the predetermined attributes comprising at least one of: traffic flow, route topology, road geometry, road type, and topography.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE EMBODIMENT

Figure 1:
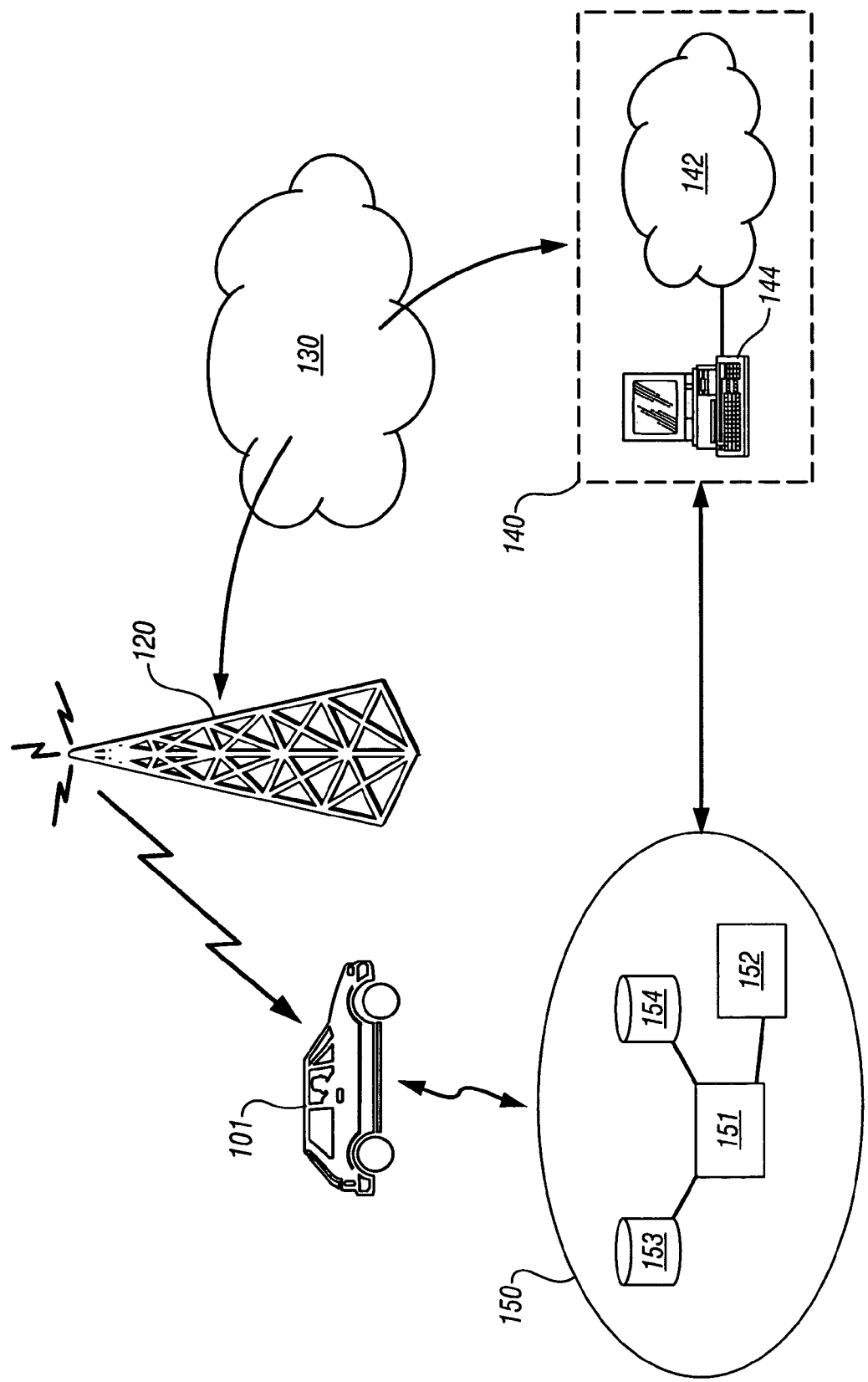
FIG. 1 is a schematic system diagram, in accordance with the present invention; and, FIG. 2 is a flowchart, in accordance with the present invention.

Referring now to the drawings, wherein the showings are for the purpose of illustrating the invention only and not for the purpose of limiting the same, FIG. 1 shows a schematic diagram of an exemplary system which has been constructed in accordance with an embodiment of the present invention, comprising an exemplary system operable to provide navigation services to operators of vehicles. The system typically includes multiple vehicles, one or more carrier systems 120, one or more communication networks 130, one or more service management subsystems 140, and one or more navigation subsystems 150. The service management subsystems may comprise one or more service management applications 142 and one or more service managers 144. The navigation subsystems 150 may comprise one or more route applications 151, 152 and one or more coordinate databases 153, 154.

The vehicle 101 may be any suitable vehicle, including, by way of example, an automobile, or a passenger-carrying unit such as a bus or train. The vehicle has a client who is an operator or other occupant of the vehicle 101, or any suitable device contained in the vehicle 101. In one embodiment of the invention, the client is a mobile or portable device equipped to communicate with service management subsystem 140. Carrier system 120 is any suitable system for transmitting a signal from vehicle 101 to service management subsystem 140. Carrier system 120 may also transmit a signal from service management subsystem 140 to vehicle 101. In one embodiment of the invention, carrier system 120 is a wireless carrier system as is well known in the art. Carrier system 120 may be for example, a transmitter/receiver unit attached to vehicle 101. Alternatively, carrier system 120 may be a separate transmitter/receiver carried by vehicle 101.

Communication network 130 is any suitable system for communicating between vehicle 101 and service management subsystem 140. In one embodiment of the invention, communication network is a public switched telephone network (PSTN). Alternatively, communication network 130 may be a multi-protocol Internet or Intranet network capable of transmitting voice and/or data in either analog or digital form or a combination of both. Alternatively, communication network 130 may be a hybrid communication network or virtual network.

Service management subsystem 140 is a system for managing a variety of services to be delivered to or from vehicle 101. In one embodiment of the invention, service management subsystem 140 manages services that are distributed over a variety of channels. For example, services may be delivered via a live agent, such as a human advisor, or via a virtual agent, such as an interactive computer program. The structure of service management subsystem 140 may enable services to be delivered in a uniform manner regardless of the channel used for delivery or of the service being delivered.

Navigation subsystem 150 is a system for generating routes to be delivered to vehicle 101 and for receiving route information from vehicle 101. Navigation subsystem 150 may be connected with or in communication with service management subsystem 140. Service management subsystem 140 may be used to manage the delivery of information to or from navigation subsystem 150 and to other parts of the network. Routes may be delivered or information may be received via a live agent, such as a human advisor, or via a virtual agent, such as an interactive computer program.

Navigation subsystem 150 typically comprises a remote server with suitable hardware or software configuration, or combination of hardware and software that is configured to generate a route, process route information, and receive information from vehicle 101. The navigation subsystem 150 typically comprises one or more route applications for generating route information and otherwise processing route information, as described hereinafter. The navigation system preferably includes one or more coordinate databases 153, 154, having a suitable software application for generating route information or otherwise processing route information, typically based upon minimum driving time or distance. Coordinate databases may be any suitable databases for storing route information, such as location coordinates. Additionally, each coordinate database 153, 154 is preferably modified to include local route attribute information, including information descriptive of traffic flow, e.g. speed, number of lanes, lane width; route topology, e.g. possible turns at endpoints; road geometry, e.g. horizontal shape, vertical curvature, and super-elevation; route usage, e.g. freeway, arterial, local, residential, business; and topography, e.g. buildings, trees, open-space, and various facilities.

Figure 2:
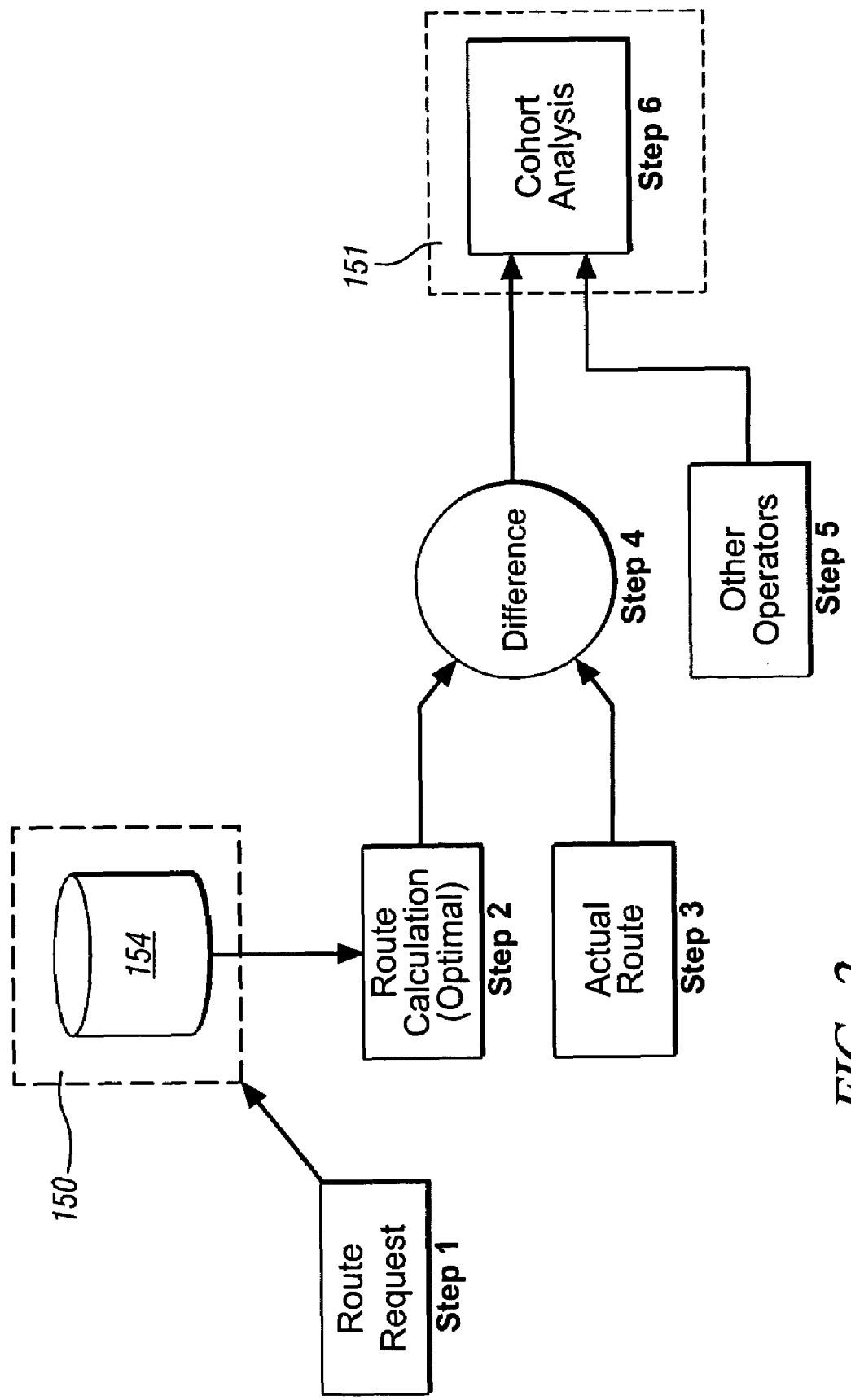

Referring now to FIG. 2, a more detailed discussion of the method and system for identifying a preferred travel route for an operator of a vehicle using cohort information is provided, with reference to the navigation system detailed in FIG. 1. The preferred navigation subsystem 150 includes a route calculation and optimization function, and an analysis model which uses cohort attribute information. The navigation subsystem 150 is preferably executed to interact with vehicle 101 having an on-board navigation computer, and operable to provide functionality of on-board navigation, as described hereinabove. The vehicle 101 is preferably equipped with a communications system, controllable by the on-board computer, which is operable to communicate with the navigation subsystem 150 upon receipt of an inquiry from the external device or upon receipt of a command from the on-board computer.

In overall operation, the navigation subsystem 150 with the route optimization function is activated when the operator requests navigation assistance by selecting an origin point and a destination point, using a user interface device connected with the navigation subsystem (Step 1). Optimal route calculation is made (Step 2). Actual route execution is monitored (Step 3), and route differences are determined (Step 4). The route difference information is supplied to the navigation subsystem 150, along with route information from other operators (Step 5), for cohort analysis (Step 6).

In operation of the exemplary navigation subsystem 150 incorporating the route optimization function and cohort model, the navigation subsystem is activated when the operator requests navigation assistance by selecting an origin point and a destination point, using a user interface device connected with the navigation computer. The navigation computer identifies a travel route, based upon estimated travel time, travel distance, and cohort attribute information that is identified by the cohort analysis model. Absent cohort attribute information, the navigation computer preferably identifies a travel route that minimizes or optimizes travel time and distance. By adding the cohort model and cohort attribute information, the navigation subsystem 150 identifies a travel route that minimizes or optimizes travel time and distance while accounting for other categorized attributes, based upon cohort analysis.

Preferably, the in-vehicle computer permits introduction of operator-selectable weighting factors assignable to the estimated travel time, travel distance, and cohort attribute information. This permits the operator to select weighting factors which reflect immediate travel desires and needs, such as to totally eliminate the cohort model, or to weight the cohort model more highly than travel time or distance. A skilled practitioner is able to implement introduction of weighting factors which meet needs of the operator.

Attribute information preferably comprises descriptors, or attributes, for each route segment. Local attribute information may be stored in the in-vehicle navigation computer, or alternatively, stored in the database 153 of the navigation subsystem 150, and be available upon request by the in-vehicle computer. Local attribute information preferably includes information descriptive of traffic flow, route topology, road geometry, road usage, and topography.

The navigation subsystem 150 is preferably operable to perform cohort analysis to determine cohort attribute information for use in navigation assistance in individual vehicles 101. This preferably comprises creating an operator profile for one or more operators of each vehicle, and communicating the operator profile to the navigation subsystem 150. Creating the operator profile for each operator includes monitoring requested trips (i.e. Step 3 of FIG. 2), and comparing operator-selected route segments to optimal route segments for each trip (Steps 2 and 4). The navigation system identifies and captures specific operator-selected route segments that are divergent from the optimal route segments, wherein optimal route segments are determined based upon route segments known to minimize or optimize travel time or distance. The navigation subsystem 150 evaluates the divergent operator-selected route segments based upon the predetermined attributes, as described above, which are either available on-board the navigation computer or available through the navigation subsystem 150. The evaluation of divergent operator-selected route segments is communicated from each vehicle 101 to the navigation subsystem 150 upon inquiry, or upon passage of some regular interval of time or number of trips.

The navigation subsystem 150 is operable to collect information from numerous vehicle operators (See Step 5 of FIG. 2). Clusters of operator profiles are created in the navigation subsystem 150, based upon similarity of the attributes of divergent operator-selected route segments. Categories of operators are determined, based upon the plurality of clusters of operator profiles, with each category defined by the attributes of divergent operator-selected route segments. Each category is populated by operators, with each operator becoming a 'cohort' of similarly attributed operators as a result of having one or more common characteristics, defined by the attributes of the category. Each operator is assigned to one of the categories, based upon the operator profile. The navigation subsystem 150 communicates to each on-board navigation computer the attributes determined to be associated with each operator. Therefore, when an operator subsequently uses the on-board navigation computer to determine a route of travel, the navigation subsystem 150 is able to select route segments based upon route selections previously made by cohorts of the operator, based upon cohort attribute information.

Although this is described as a navigation system for a vehicle used on highways, it understood that alternate embodiments of this invention may include various transportation systems wherein the operator is able to select alternative routes. The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for identifying a preferred travel route for an operator of a vehicle, comprising:
   providing a navigation system having a route optimization function incorporating a cohort attribute model;
   selecting an origin point and a destination point; and,
   determining a travel route based upon estimated travel time, travel distance and cohort attribute information;
   wherein providing a navigation system having a route optimization function incorporating a cohort attribute model comprises:
   A) determining information for a plurality of vehicle operators, including:
      1) creating an operator profile for each operator based upon attributes of operator-selected route segments, comprising:
         a) comparing operator-selected route segments to optimal route segments for a plurality of trips;
         b) capturing operator-selected route segments divergent from the optimal route segments; and,
         c) evaluating the operator-selected route segments divergent from the optimal route segments based upon attributes of the operator-selected route segments; and,
      2) capturing a plurality of operator profiles, each based upon similarity of attributes of divergent operator-selected route segments;
   B) determining a plurality of categories of operators, each category defined by attributes of divergent operator-selected route segments; and,
   C) assigning each operator to one of the plurality of categories, based upon the operator profile.

2. The method of claim 1, further comprising:
   D) generating navigation instructions.

3. The method of claim 2, wherein determining a travel route based upon estimated travel time, travel distance and cohort attribute information further comprises: determining a travel route based upon operator-selectable weightings of the estimated travel time, travel distance and cohort attribute information.

4. The method of claim 1, wherein comparing operator-selected route segments to optimal route segments for each trip comprises comparing operator-selected route segments to a corresponding minimal-time route segment.

5. The method of claim 1, wherein comparing operator-selected route segments to optimal route segments for each trip comprises comparing operator-selected route segments to a corresponding minimal-distance route segment.

6. The method of claim 1, wherein the attributes comprise at least one of: traffic flow, route topology, road geometry, road type, and topography.

7. Article of manufacture comprising:
   a storage medium having a computer program encoded therein for effecting a method to identify a preferred travel route for an operator of a vehicle, the vehicle having an in-vehicle system operable to access a navigation system, and having a user interface operable to input an operator-selectable origin point and a destination point;

said computer program comprising:
- code for the navigation system comprising a route optimization function incorporating a cohort attribute model;
- code to determine a travel route based upon estimated travel time, travel distance, and cohort attribute information, the cohort attribute information communicable to the storage medium from a remote navigation system; and,
- code to generate navigation instructions;

wherein the remote navigation system comprises: a remote storage medium having a computer program encoded therein for effecting a method to determine the cohort attribute information; said computer program encoded in the remote storage medium comprising:
- code to capture a plurality of operator profiles, each operator profile comprising a plurality of attributes of divergent operator-selected route segments;
- code to create a plurality of clusters of operator profiles based upon similarity of the plurality of attributes of divergent operator-selected route segments;
- code to determine a plurality of categories of operators based upon the clusters of operator profiles; and,
- code to assign each operator to one of the plurality of categories of operators based upon an operator profile.

8. The article of manufacture of claim 7, wherein the code to determine a travel route based upon estimated travel time, travel distance, and cohort attribute information farther comprises: code to determine the travel route modifiable by operator-selectable weightings of the estimated travel time, travel distance, and cohort attribute information.

9. Article of manufacture, comprising:
a remote storage medium having a computer program encoded therein for effecting a method to determine cohort attribute information for a navigation system; said computer program comprising:
- code to capture a plurality of operator profiles, each operator profile comprising a plurality of attributes;
- code to create a plurality of clusters of operator profiles based upon similarity of attributes and similarity of divergent operator-selected route segments;
- code to determine a plurality of categories of operators based upon the clusters of operator profiles, each category defined by attributes of divergent operator-selected route segments; and,
- code to assign each operator to one of the plurality of categories of operators based upon an operator profile.

* * * * *